No. 895,741. PATENTED AUG. 11, 1908.
H. C. FRESHOUR.
TANK FLUSH VALVE.
APPLICATION FILED AUG. 22, 1907.

Witnesses:
H. A. Lamb.
S. W. Atherton.

Inventor
Henry C. Freshour
By Attorney
N. Webster

UNITED STATES PATENT OFFICE.

HENRY C. FRESHOUR, OF BRIDGEPORT, CONNECTICUT.

TANK FLUSH-VALVE.

No. 895,741.   Specification of Letters Patent.   Patented Aug. 11, 1908.

Application filed August 22, 1907. Serial No. 389,677.

*To all whom it may concern:*

Be it known that I, HENRY C. FRESHOUR, a citizen of the United States, residing at Bridgeport, county of Fairfield, State of Connecticut, have invented a new and useful Tank Flush-Valve, of which the following is a specification.

This invention relates to valves for the outlet or flush pipe of tanks, and refers particularly to a type of valve which is hollow and elastic and which is seated by the pressure of water within the tank.

One of the objects of my invention is to provide a valve of this character which cannot become elongated and jammed in the outlet pipe by the pressure of water in the tank, such pressure having the effect of spreading the valve outwardly against the upper portion of the seat instead of downwardly into or within the seat and outlet.

Another object of the invention is to provide a valve of this character having a portion which will always remain within the outlet so as to guide the valve portion when closing and insure its proper seating.

Other objects are to provide greater efficiency and durability, all as will be particularized hereinafter.

Figure 1:
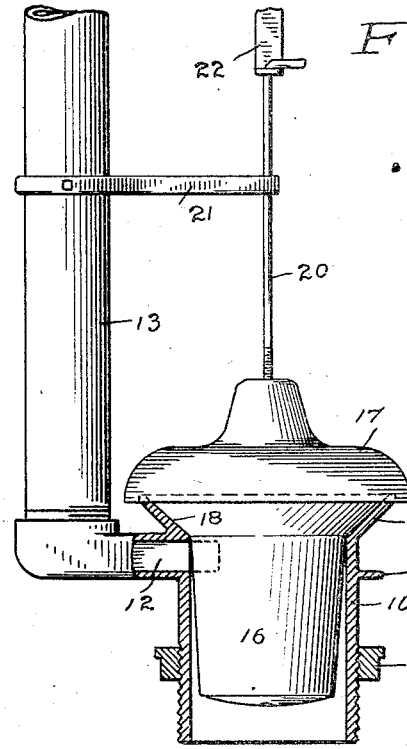
Figure 2:
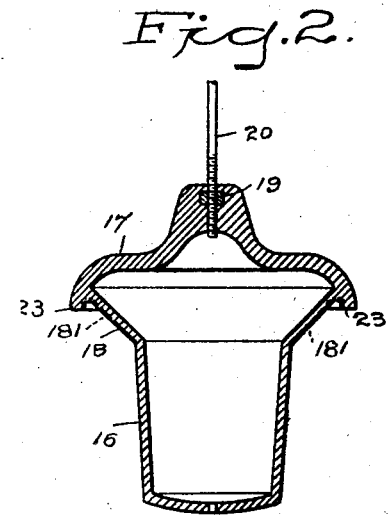
Figure 3:
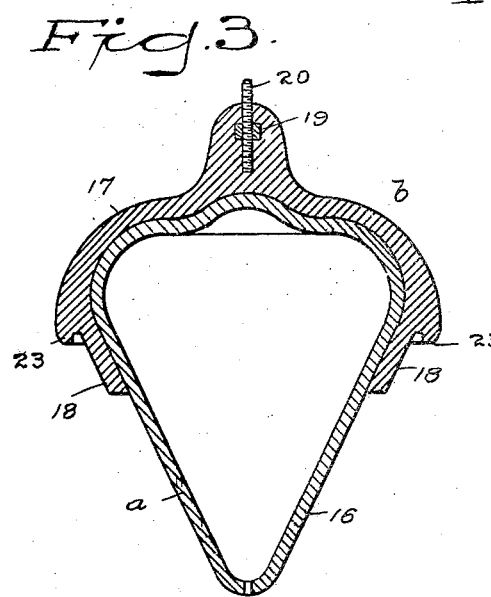
Figure 4:
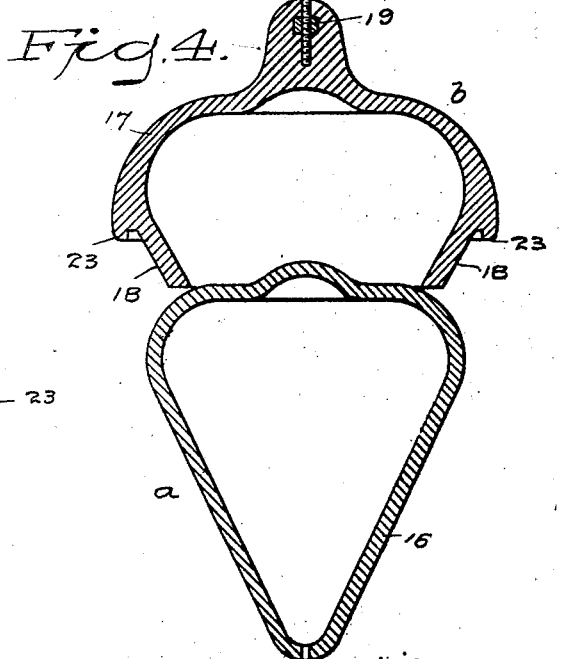

Of the accompanying drawings:—Figure 1 is an elevation of a valve embodying my improvements, a seat therefor and an outlet pipe being shown in section; Fig. 2 represents a vertical section through the valve. Fig. 3 is a view similar to Fig. 2, but showing a different embodiment of my invention; Fig. 4 is a sectional view of the two parts of the valve shown in Fig. 3, before assembling.

Similar reference characters indicate the same or similar parts in all the views.

In Fig. 1, a portion of an outlet pipe is shown at 10, said pipe having a valve seat 11, and a port 12 with which an overflow pipe 13 communicates. It also has a flange 14 which usually rests on the upper surface of the bottom of a flush tank, and a nut 15 fitting the threaded portion of the pipe, which nut is turned home against the under surface of the tank bottom. This structure is well-known and is only referred to for the purpose of illustrating one of the uses of my invention, which latter relates only to the valve, and which valve may be employed in connection with any other well-known or preferred outlet and valve seat.

The valve shown in Figs. 1 and 2 comprises a hollow rubber bulb or air-chamber, the lower portion 16 of which is slightly tapering, the upper portion 17 being shaped somewhat like an inverted saucer, and the intermediate portion 18 being tapered to conform to the seat 11. The upper portion 17 is preferably somewhat thicker than the rest of the bulb and its thickened central portion has embedded therein a nut 19 by means of which and a threaded rod 20, the valve is raised and lowered. The rod 20 is shown as passed through a guide 21 supported by the pipe 13, a part of the connection by which the rod and valve may be lifted being indicated at 22. A somewhat more exact way of describing the shape of the top or upper portion 17 of the bulb is that any radial section forms an approximately ogee-curve. The result of this is that the water pressure in the tank causes the rim and the upper portion of the valve section 18 to spread and engage the seat 11 more tightly, this being due to the fact that the valve is so elastic that the pressure of the water can somewhat flatten out or spread the top portion 17. To further prevent liability of the bulb being forced down into the outlet, by elongation, the bulb is preferably formed with an overhanging marginal rib 23 which fits over the upper edge of the seat 11 so that excessive pressure would only cause said rib to hug said upper edge the more tightly.

In practice, I prefer to reinforce the portions which engage the seat 11 with fabric, as indicated at 181, to increase their durability.

Instead of making the bulb in one piece, it may be of separate parts as indicated in Figs. 3 and 4, in which the member $a$ is the lower one and is of thinner and more flexible rubber than the member $b$. Said member $a$ is slipped partially within the inverted cup-shaped member $b$ and the greater strength of the latter holds them assembled. With the exception that the lower portion 16 is more tapering than in Figs. 1 and 2, the two complete shapes are practically the same.

In both embodiments of the invention, the construction is such that a reliable valve closure is provided for, and when the bulb is raised to permit water to escape the seat 11, which is usually of brass, cannot be so acted upon by any substance carried by the water as to become furrowed, as it is protected by the overhanging rib.

I do not herein claim a tank flush valve comprising a float having an enlarged upper portion and a cone-shaped tip and a flexible cap covering the upper portion and having a valve portion adapted to engage a valve seat, as the same forms the subject matter of my application 416,223, filed Feb. 17, 1908.

Having now described my invention, I claim:—

1. An elastic bulb-valve having a guiding lower portion to enter an outlet pipe, an inverted cup-shaped upper portion, and an intermediate valve portion which tapers from the cup-shaped portion towards the said guiding portion.

2. An elastic bulb-valve having a tapering lower portion, an inverted cup-shaped upper portion, and an intermediate downwardly tapering valve portion.

3. An elastic bulb-valve having its upper portion centrally thickened and ogee-curve shaped in radial cross section, a tapering lower portion, and an intermediate downwardly tapering valve portion.

4. An elastic bulb-valve having a guiding lower portion to enter an outlet pipe, an upper portion, an intermediate downwardly tapering valve portion, and an overhanging annular rib adapted to fit over the edge of a valve-seat.

5. An elastic bulb-valve having its upper portion centrally thickened and ogee-curve shaped in radial cross section, a tapering lower portion, and an intermediate downwardly tapering valve portion, an integral annular rib having a groove in its lower side being provided at the point of greatest diameter of the bulb.

In testimony whereof I affix my signature, in presence of two witnesses.

HENRY C. FRESHOUR.

Witnesses:
A. M. WOOSTER,
S. W. ATHERTON.